United States Patent [19]

Kranich

[11] Patent Number: 5,761,443
[45] Date of Patent: Jun. 2, 1998

[54] COMPUTER SYSTEM EMPLOYING A BUS CONVERSION BRIDGE FOR INTERFACING A MASTER DEVICE RESIDING ON A MULTIPLEXED PERIPHERAL BUS TO A SLAVE DEVICE RESIDING ON A SPLIT-ADDRESS, SPLIT-DATA MULTIPLEXED PERIPHERAL BUS

[75] Inventor: Uwe Kranich, Kirchheim, Germany

[73] Assignee: Advanced Micro Systems, Inc., Sunnyvale, Calif.

[21] Appl. No.: 487,063

[22] Filed: Jun. 7, 1995

[51] Int. Cl.$^6$ ..................................................... G06F 13/00
[52] U.S. Cl. .................... 395/280; 395/299; 395/775; 395/306; 364/240; 364/242
[58] Field of Search ........................... 395/280, 306, 395/776, 309, 308, 325, 281, 180, 200.01, 650, 299; 364/240, 242

[56] References Cited

U.S. PATENT DOCUMENTS

| | | | |
|---|---|---|---|
| 5,191,656 | 3/1993 | Forde, III et al. | 395/325 |
| 5,396,602 | 3/1995 | Amini et al. | 395/325 |
| 5,426,739 | 6/1995 | Lin et al. | 395/325 |
| 5,450,551 | 9/1995 | Amini et al. | 395/299 |
| 5,499,346 | 3/1996 | Amini et al. | 395/308 |
| 5,519,872 | 5/1996 | Khandekar et al. | 395/775 |
| 5,522,050 | 5/1996 | Amini et al. | 395/306 |
| 5,542,053 | 7/1996 | Bland et al. | 395/309 |
| 5,557,758 | 9/1996 | Bland et al. | 395/308 |
| 5,564,026 | 10/1996 | Amini et al. | 395/308 |
| 5,568,619 | 10/1996 | Blackledge et al. | 395/281 |

OTHER PUBLICATIONS

82375EB PCI–EISA Bridge (PCEB) Order No.: 290477–001 by Intel, Apr. 1993.
PCI Local Bus Specification, Revision 2.0, Apr. 30, 1993, pp. i–x, 1–198.

*Primary Examiner*—Ayaz R. Sheikh
*Assistant Examiner*—Eric S. Thlang
*Attorney, Agent, or Firm*—Conley, Rose & Tayon; B. Noel Kivlin

[57] ABSTRACT

A multiple-transaction peripheral bus is provided with multiplexed address and data lines which is particularly adapted for portable applications. The multiple-transaction peripheral bus accommodates compatibility with existing hardware designs for a higher performance bus system with minimal conversion logic. A bus conversion bridge provides an interface between a 32-bit Peripheral Component Interconnect (PCI) bus and a 16-bit transaction Address/Data (A/D) which is associated with half the number of multiplexed address/data lines in comparison with the 32-bit PCI bus. The PCI bus accommodates data transfers between master and slave devices associated therewith, as does the narrower multiple-transaction A/D bus. The bus conversion bridge accommodates data transfers between the two buses, allowing a master device on one bus to communicate with a slave device on the other bus. The bus conversion bridge accomplishes this by 1) splitting both the 32-bit address/4-bit bus command and 32-bit data/4-bit byte enables received from the PCI bus during respective address and data phases into separate 16-bit/2-bit packets, and transmitting these packets over the multiple-transaction A/D bus during separate bus cycles, and 2) assembling multiple 16-bit address/2-bit bus command and multiple 16-bit data/2-bit byte enables received from the multiple-transaction A/D bus during separate bus cycles into single 32-bit/4-bit packets, and transmitting these packets over the PCI bus during respective address and data phases. Thus the bus conversion bridge allows a portable computer system with a narrower, 16-bit multiple-transaction A/D bus to communicate with peripherals on a wider, 32-bit PCI bus.

9 Claims, 11 Drawing Sheets

COMPUTER SYSTEM EMPLOYING A BUS CONVERSION BRIDGE FOR INTERFACING A MASTER DEVICE RESIDING ON A MULTIPLEXED PERIPHERAL BUS TO A SLAVE DEVICE RESIDING ON A SPLIT-ADDRESS, SPLIT-DATA MULTIPLEXED PERIPHERAL BUS

BACKGROUND OF THE INVENTION

1. Field of the Invention

This invention relates to computer systems and more particularly to the derivation of a multiple-transaction multiplexed peripheral bus from a higher performance multiplexed peripheral bus. The invention also relates to a bus system particularly suited for portable applications and which accommodates, with minimal modification, compatibility with existing hardware designs adapted for higher performance bus systems.

2. Description of the Relevant Art

Today's graphics-oriented operating systems such as Windows and OS-2 require the transfer of large quantities of data between devices at high speeds in order to respond quickly to user requests. High performance "local buses" have been developed to meet these high data bandwidth requirements.

The Peripheral Component Interconnect (PCI) local bus architecture offers high performance at low cost. The PCI bus employs a 32-bit data path with a 64-bit upgrade path, has multiplexed address and data lines, and supports burst-mode data transfers. The PCI bus is further associated with multiplexed control/byte enable lines and an encoded control signal protocol. Capable of operating at up to 33 MHz and requiring no special driver hardware, the PCI bus is an economical solution to the high data bandwidth component interconnect problem.

Due to its attributes, a significant amount of time and effort has been invested in developing peripheral device interfaces for the PCI bus. Each PCI bus interface requires a minimum of 47 pins for a slave (target-only) device and 49 pins for a master device to handle data and addressing, interface control, arbitration, and system functions.

For some applications, such as portable computing, the PCI bus architecture is attractive from performance and compatibility standpoints, but the relatively high pin counts for interface circuits and number of wires required to implement the bus increase the size, weight, and cost of portable systems. It would therefore be desirable to reduce the interface pin counts and number of bus interconnections within portable computing environments to thereby reduce the size, weight, and cost of such systems. It would further be desirable to employ a bus configuration for portable computing applications which takes advantage of the large investment already made in the development of device interfaces for the PCI bus.

SUMMARY OF THE INVENTION

The problems outlined above are in large part solved by a multiple-transaction peripheral bus with multiplexed address and data lines which is particularly adapted for portable applications in accordance with the present invention. The multiple-transaction peripheral bus hereof accommodates compatibility with existing hardware designs for a higher performance bus system with minimal conversion logic. In one embodiment, a bus conversion bridge provides an interface between a 32-bit PCI bus and a 16-bit multiple-transaction A/D bus which is associated with half the number of multiplexed address/data lines in comparison with the 32-bit PCI bus. The PCI bus accommodates data transfers between master and slave devices associated therewith, as does the narrower multiple-transaction A/D bus. The bus conversion bridge accommodates data transfers between the two buses, allowing a master device on one bus to communicate with a slave device on the other bus. The bus conversion bridge accomplishes this by 1) splitting both the 32-bit address/4-bit bus command and 32-bit data/4-bit byte enables received from the PCI bus during respective address and data phases into separate 16-bit/2-bit packets, and transmitting these packets over the multiple-transaction A/D bus during separate bus cycles, and 2) assembling split 16-bit address/2-bit bus command and split 16-bit data/2-bit byte enables received from the multiple-transaction A/D bus during separate bus cycles into single 32-bit/4-bit packets, and transmitting these packets over the PCI bus during respective address and data phases. Thus the bus conversion bridge allows a portable computer system with a narrower, 16-bit multiple-transaction A/D bus to communicate with peripherals on a wider, 32-bit PCI bus.

In another embodiment, a bus bridge provides an interface between a CPU local bus and a 16-bit multiple-transaction A/D bus. The multiple-transaction A/D bus follows PCI bus protocols which are modified only to the extent necessary to accommodate the splitting of address and data information into packets which will fit on the multiple-transaction A/D bus. This allows designers to take advantage of the large investment already made in the development of peripheral device interfaces for the PCI bus. Only slight modifications need be made to existing device interface designs to employ the 16-bit multiple-transaction A/D bus.

BRIEF DESCRIPTION OF THE DRAWINGS

Other objects and advantages of the invention will become apparent upon reading the following detailed description and upon reference to the accompanying drawings in which.

Figure 1:
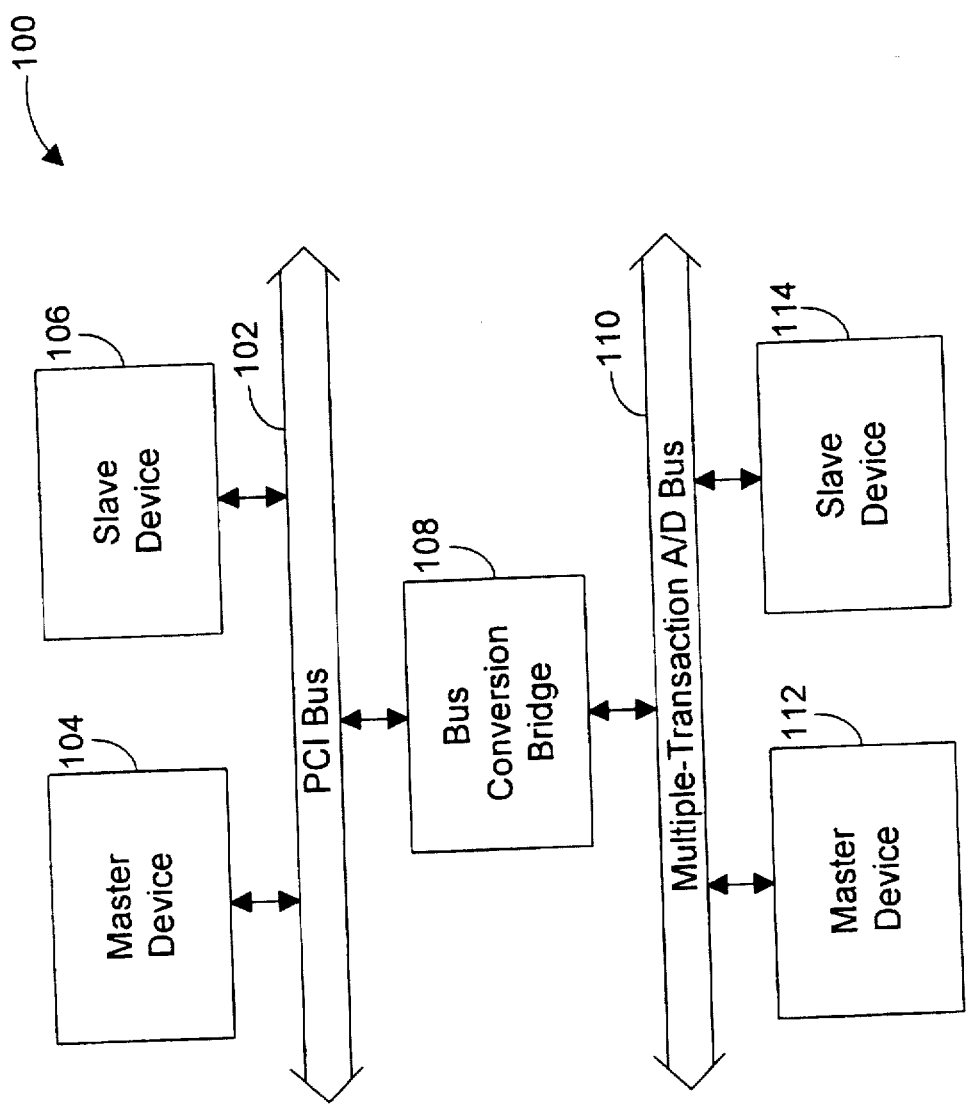
FIG. 1 is a block diagram of a standard 32-bit PCI bus and a narrower 16-bit multiple-transaction A/D bus, interconnected by a bus conversion bridge.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

Referring now to the drawings, FIG. 1 is block diagram of a computer system 100 including master device 104 and slave device 106 coupled to a PCI bus 102, a master device 112 and a slave device 114 coupled to a multiple-transaction A/D bus 110, and a bus conversion bridge 108 coupling the multiple-transaction A/D bus 110 to the PCI bus 102. Master device 104 is illustrative of, for example, a desktop computer system, and slave device 106 is illustrative of a system memory, video display terminal, or compact disk read-only memory drive. Master device 112 is illustrative of a portable computer system, and slave device 114 is illustrative of a disk drive unit. It is understood that additional or alternative master and slave devices could be connected within the system.

Details regarding the PCI bus 102 are described within the publication entitled "PCI Local Bus Specification"; PCI Special Interest Group; Hillsboro, Oreg.; 1993. This publication is incorporated herein by reference in its entirety. It is noted that other peripheral buses with multiplexed address/data lines could be alternately employed. In the below description it is understood that data transfers on PCI bus 102 are achieved in a conventional manner.

The bus conversion bridge 108 provides an interface between the wider, 32-bit PCI bus 102 and the narrower, 16-bit multiple-transaction A/D bus. The bus conversion bridge accommodates data transfers between the two buses, allowing a master device on one bus to communicate with a slave device on the other bus. As will be explained in further detail below, the bus conversion bridge accomplishes this by 1) splitting both the 32-bit address/4-bit bus command and 32-bit data/4-bit byte enables received from the PCI bus 102 during respective address and data phases into separate 16-bit/2-bit packets, and transmitting these packets over the multiple-transaction A/D bus 110 during separate bus cycles, and 2) assembling split 16-bit address/2-bit bus command and split 16-bit data/2-bit byte enables received from the multiple-transaction A/D bus during separate bus cycles into single 32-bit/4-bit packets, and transmitting these packets over the PCI bus 102 during respective address and data phases.

The execution of exemplary bus cycles on multiple-transaction A/D bus 110 as well as the effectuation of data transfers through bus conversion bridge 108 will be described below in conjunction with FIGS. 2–10. For one embodiment, multiple-transaction A/D bus 110 supports the signals in Table 1 below.

TABLE 1

| Multiple-Transaction A/D Bus Signals. | |
|---|---|
| Name | Number of Pins |
| CLK | 1 |
| RST# | 1 |
| AD [15:0] | 16 |
| C/BE [1:0] # | 2 |
| PAR | 1 |
| FRAME# | 1 |
| IRDY# | 1 |
| TRDY# | 1 |
| STOP# | 1 |
| LOCK# | 1 |
| IDSEL | 1 |
| DEVSEL# | 1 |
| REQ# | 1 |
| GNT# | 1 |
| PERR# | 1 |
| SERR# | 1 |

Figure 2:
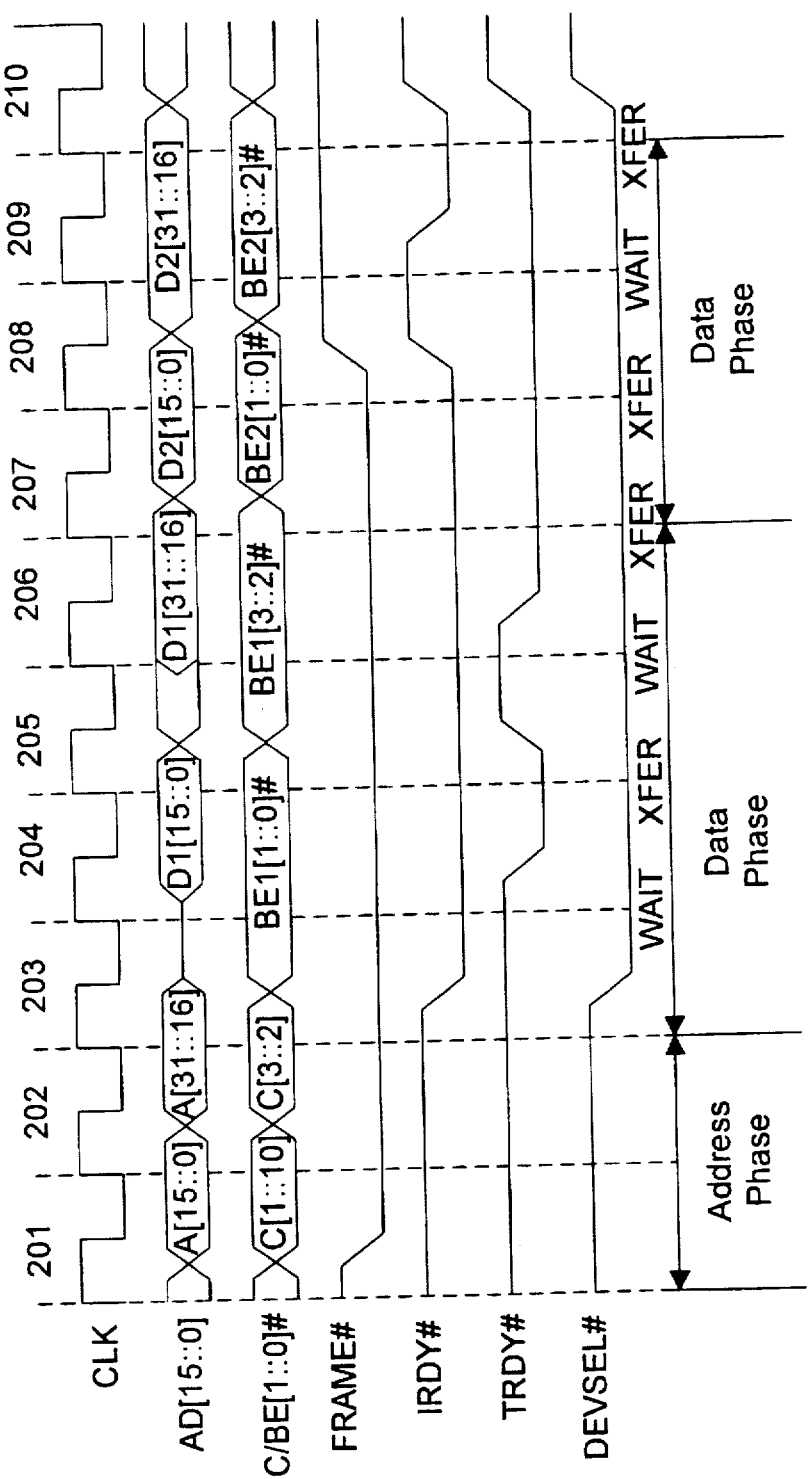
FIG. 2 is a timing diagram which illustrates the generation of address, data, and control signals for a burst read operation between peripheral devices coupled to the 16-bit multiple-transaction A/D bus in FIG. 1.

Referring now to FIG. 2, a timing diagram which illustrates the generation of address, data, and control signals for a burst read operation between devices connected to the multiple-transaction A/D bus 110 in FIG. 1 (e.g., master device 112 and slave device 114) is shown. The read transaction begins when a master device drives the lower 16 bits of the 32-bit address of a slave device on the AD[15:00] lines, the lower two bits of a four-bit bus command on C/BE[1:0]#, and asserts the FRAME# signal during bus cycle 201 of FIG. 2.

During the next bus cycle 202, the master device drives the upper 16 bits of the 32-bit address on the AD[15:00] lines and the upper two bits of the bus command on C/BE[1:0]#. This cycle ends the address phase.

The first data phase begins during bus cycle 203. The slave device responds to the valid address by asserting the DEVSEL# signal, and the master device signals its ready status by asserting IRDY#. The master device stops driving the AD[15:00] lines to allow the slave device to drive them with the requested data. The master device drives the lower two bits of the four-bit byte enables on the C/BE[1:0]# lines.

During bus cycle 204, the slave device drives the AD[15:00] lines with the lower 16-bits of the first 32-bit data doubleword requested. The slave device asserts the TRDY# signal to indicate that valid data is available on AD[15:00]. The first half of the first data phase is completed as the data is transferred at the rising edge of the CLK signal ending bus cycle 204.

During bus cycle 205, the master device drives the upper two bits of the four-bit byte enables on C/BE[1:0]#. The slave device signals that valid data is not yet available on the AD[15:00] lines by deasserting TRDY#. The master must therefore wait to receive the data.

The slave drives the upper 16 bits of the data word on AD[15:00] during bus cycle 206, and signals the master that valid data is being driven by asserting TRDY#. The master responsively receives the upper 16 bits of the first data doubleword at the rising edge of the CLK, ending the first data phase.

During bus cycle 207, the master device drives the lower two byte enable bits on C/BE[1:0]#. The slave device drives the lower 16 bits of the second data doubleword on the AD[15:00] lines. The master stores the lower 16 bits of the second data doubleword at the rising edge of CLK, signaling the completion of the first half of the second data phase.

The slave device drives the upper 16 bits of the 32-bit data doubleword on AD[15:00] and the two corresponding byte enable bits on C/BE[1:0]# during bus cycle 208, and signals the next data transfer is the last by deasserting FRAME#. The master device signals it is not ready to receive data by deasserting IRDY#. The slave device must wait to transmit the upper 16 bits of the 32-bit data doubleword.

During bus cycle 209, the master device signals it is again ready to receive data by reasserting the IRDY# signal. The master device receives the upper 16 bits of the second 32-bit data doubleword at the rising edge of CLK. The second and final data phase is now complete.

During bus cycle 210, the master device deasserts IRDY#, and the slave device deasserts TRDY# and DEVSEL#. This completes the burst read operation on the multiple-transaction A/D bus.

Figure 3:
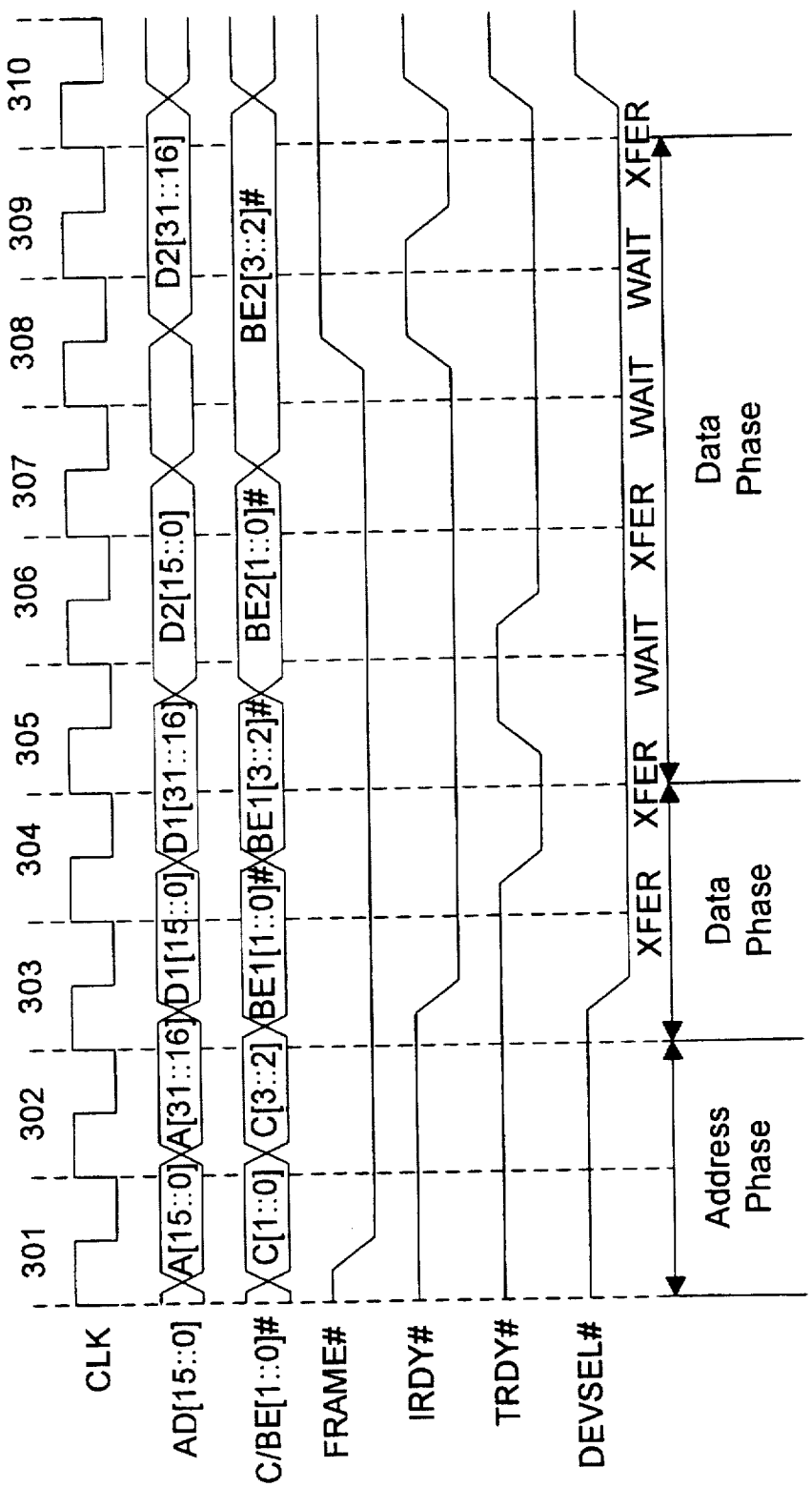
FIG. 3 is a timing diagram which illustrates the generation of address, data, and control signals for a burst write operation between peripheral devices coupled to the 16-bit multiple-transaction A/D bus in FIG. 1.

FIG. 3 is a timing diagram which illustrates the generation of address, data, and control signals for a burst write operation between devices connected to the multiple-transaction A/D bus in FIG. 1. The write transaction begins when a master device drives the lower 16 bits of the 32-bit address of a slave device on the AD[15:00] lines, the lower two bits of a four-bit bus command on C/BE[1:0]#, and asserts the FRAME# signal during bus cycle 301 of FIG. 3.

During the next bus cycle 302, the master device drives the upper 16 bits of the 32-bit address on the AD[15:00] lines and the upper two bits of the bus command on C/BE[1:0]#. This cycle ends the address phase.

The first data phase begins during bus cycle 303. The slave device responds to the valid address by asserting the DEVSEL# signal, and asserts TRDY# in recognition of a write operation. The master device drives the lower 16 bits of a 32-bit data doubleword on the AD[15:00] lines, the lower two bits of the four-bit byte enables on the C/BE[1:0]# lines, and signals valid data is being driven by asserting IRDY#. The slave device receives the lower 16 bits of the 32-bit data doubleword in accordance with the byte enables at the rising edge of CLK, thus completing the first half of the first data phase.

During bus cycle 304, the master device drives the upper 16 bits of the first 32-bit data doubleword on the AD[15:00] lines and the upper two bits of the four-bit byte enables on the C/BE[1:0]# lines. The slave device receives the upper 16 bits of the 32-bit data doubleword in accordance with the byte enables at the rising edge of CLK, thus completing the first data phase.

During bus cycle 305, the master device drives the upper 16 bits of the second 32-bit data doubleword on the AD[15:00] lines and the lower two bits of the four-bit byte enables for the second data doubleword on C/BE[1:0]#. The slave device signals it is not ready to receive the data by deasserting TRDY#. The master must therefore wait to transfer the data.

The slave device signals it is again ready to receive data by reasserting the TRDY# signal during bus cycle 306. The slave receives the lower 16 bits of the second data doubleword at the rising edge of the CLK, ending the first half of the second data phase.

During bus cycle 307, the master device signals valid data is not being driven by deasserting the IRDY# signal. The slave device is also not ready to receive data, and deasserts TRDY#. The write operation is suspended.

The master device drives the upper 16 bits of the second 32-bit data doubleword on AD[15:00], the upper two bits the four-bit byte enables for the second data doubleword on C/BE[1:0]#, and signals valid data is being driven by reasserting the IRDY# signal in bus cycle 308. The slave device is still not ready to receive data, however. The master device must therefore wait to transfer data.

During bus cycle 309, the slave device signals it is again ready to receive data by reasserting the TRDY# signal. The slave device receives the upper 16 bits of the second 32-bit data doubleword at the rising edge of CLK. The second and final data phase is now complete.

During bus cycle 310, the master device deasserts IRDY#, and the slave device deasserts TRDY# and DEVSEL#. This completes the burst write operation on the multiple-transaction A/D bus 110.

Figure 4:
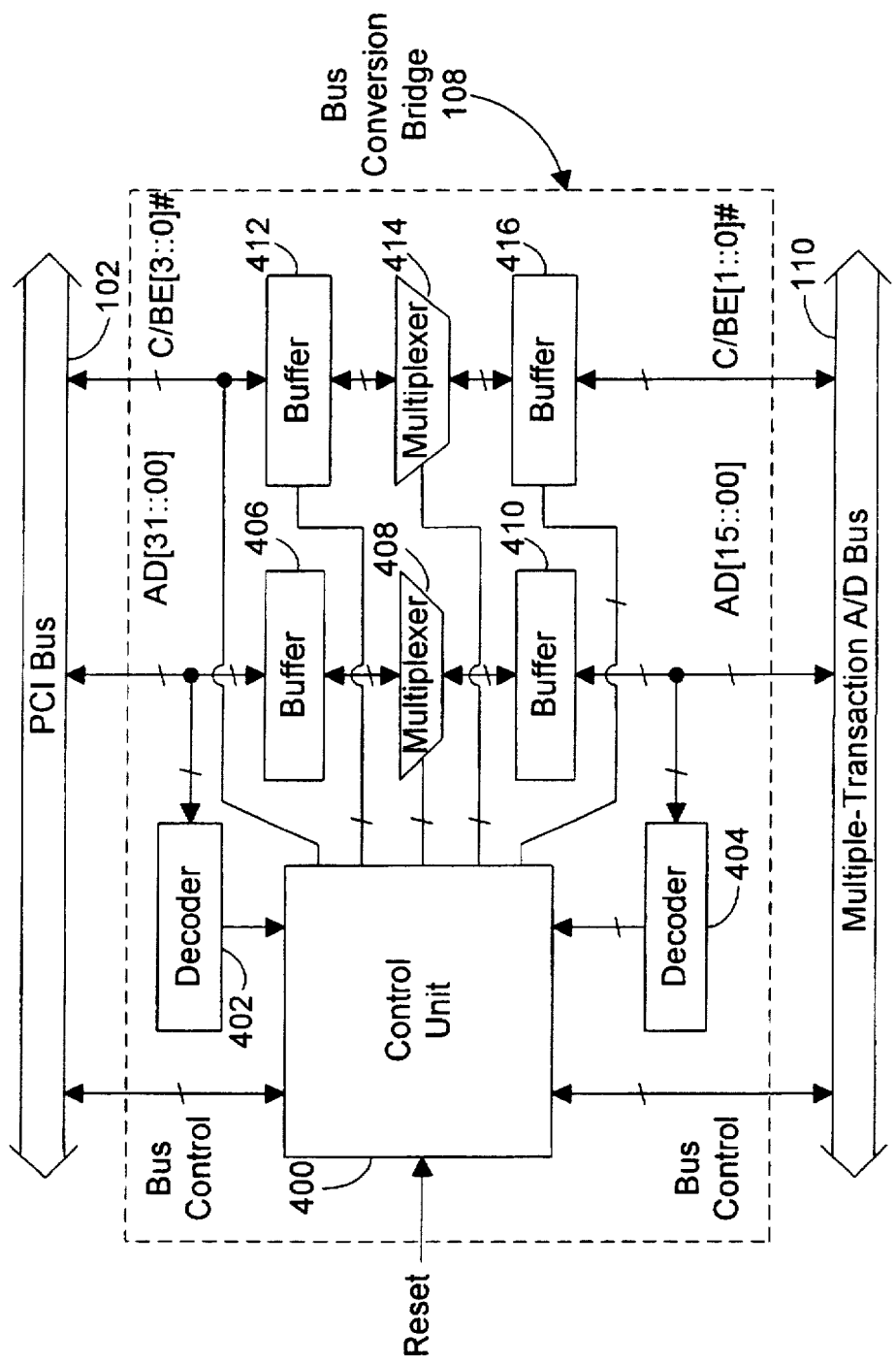
FIG. 4 is a block diagram of an exemplary embodiment of a bus conversion bridge.

Turning next to FIG. 4, a block diagram of an exemplary embodiment of the bus conversion bridge 108 of FIG. 1 will be described. As stated previously, bus conversion bridge 108 orchestrates the transfer of designated cycles between PCI bus 102 and multiple-transaction bus 110. As illustrated in FIG. 4, PCI bus 102 is coupled to a control unit 400, a decoder 402, and buffers 406 and 412. The multiple-transaction A/D bus 110 is coupled to control unit 400, a decoder 404, and buffers 410 and 416. A multiplexer (bidirectional) 408 is coupled to buffers 406 and 410, and a multiplexer (bidirectional) 414 is coupled to buffers 412 and 416. Buffer 406 is 32 bits wide, and is used to input data from and output data to the AD[31:00] lines of PCI bus 102. Buffer 412 is four bits wide, and is used to input data from and output data to the C/BE[3:0]# lines of PCI bus 102. Buffer 410 is 16 bits wide, and is used to input data from and output data to the AD[15:00] lines of multiple-transaction bus 110. Buffer 416 is two bits wide, and is used to input data from and output data to the C/BE[1:0]# lines of multiple-transaction bus 110.

As mentioned above, the bus conversion bridge 108 receives information from one bus (i.e., either PCI bus 102 or multiple-transaction bus 110), repackages the information, and transmits the information over the other bus. As will be described in more detail below, algorithmic state machines are embodied within control unit 400 to control the transfer of cycles from PCI bus 102 to multiple-transaction A/D bus 110, and vice versa. That is, certain communications initiated by a device coupled to the multiple-transaction A/D bus 110 causes control unit 400 to invoke an algorithmic state machine to repackage the information and transmit it over the PCI Bus 102. Similarly, certain communications initiated by a device coupled to the PCI bus 102 causes control unit 400 to invoke a different algorithmic state machine to repackage the information and transmit it over the multiple-transaction A/D bus 110.

Figure 5:
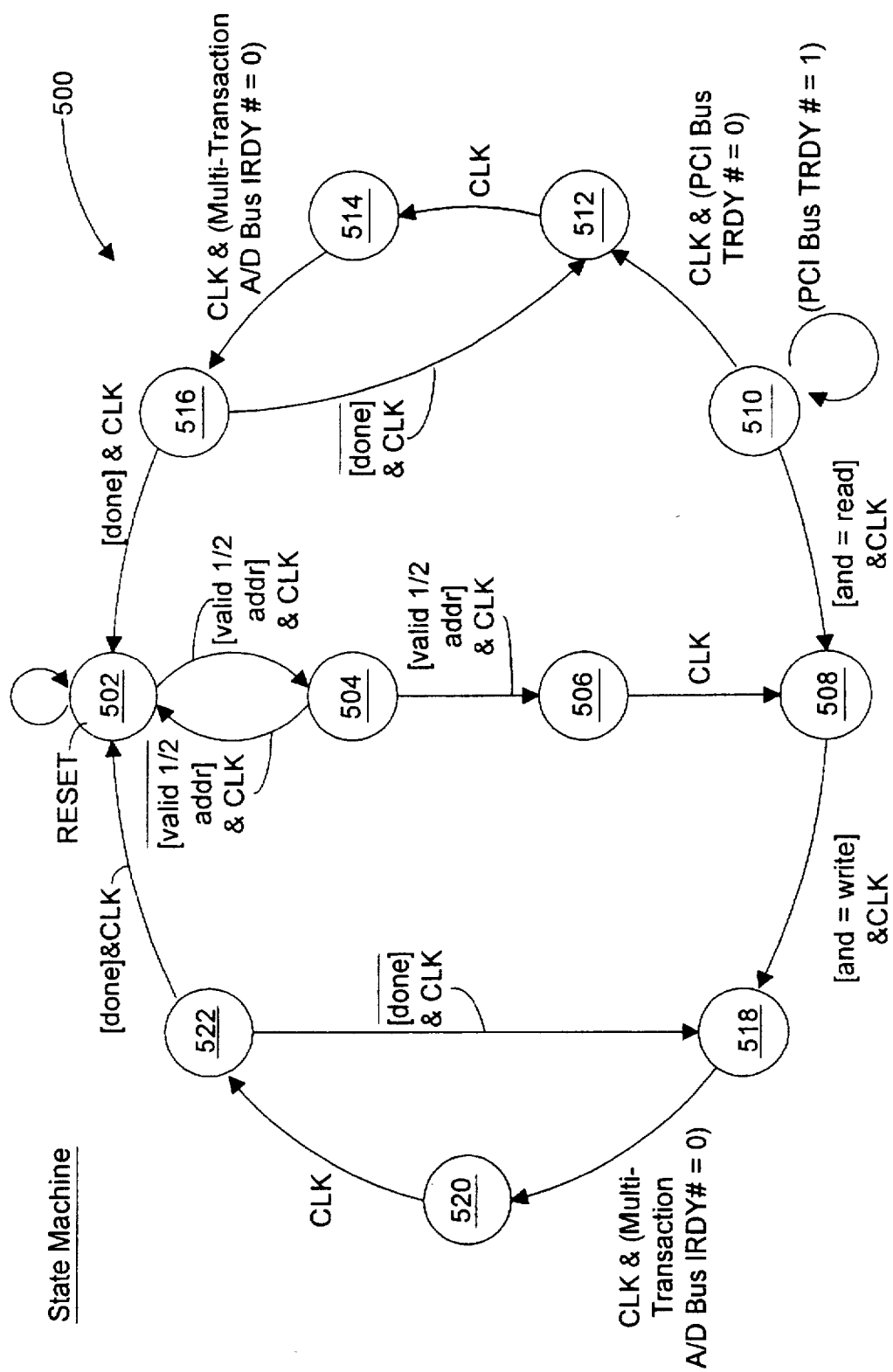
FIG. 5 is a diagram of an algorithmic state machine embodied within the control unit of the bus conversion bridge which handles communications initiated by a device coupled to the 16-bit multiple-transaction A/D bus.

FIG. 5 is a diagram of an algorithmic state machine 500 embodied within the control unit 400 of bus conversion bridge 108 which orchestrates the transfer of cycles initiated on the multiple-transaction A/D bus 110 to PCI bus 102. State machine 500 includes a total of eleven states 502, 504, 506, 508, 510, 512, 514, 516, 518, 520, and 522. State machine enters state 502 when an external RESET signal is asserted, and remains in state 502 when not involved in a bus transaction. In state 502, all bus control signals are deasserted.

Referring collectively to FIGS. 4 and 5, a bus transaction begins when a device requiring service asserts the FRAME# signal (i.e., drives FRAME# to logic low). When decoder 404 detects the lower 16 bits of a 32-bit address on the AD[15:00] lines of the multiple-transaction bus during a bus cycle, state machine 500 enters state 504. While in state 504, control unit 400 causes buffer 410 to store (or alternatively to simply pass) the lower 16 bits of a valid address on lines AD[15:00] and causes buffer 416 to store (or alternatively to simply pass) the lower two bits of a bus command on lines C/BE[1:0]#. Control unit 200 also causes multiplexer 408 to direct the lower 16 bits of the address to the inputs of the lower 16 bits of buffer 406, and causes multiplexer 414 to direct the lower two bits of a bus command signal in buffer 416 to the inputs of the lower two bits of buffer 412.

If the upper 16 bits of a 32-bit address are detected on the AD[15:00] lines of the multiple-transaction A/D bus 110 by decoder 404 during the next bus clock cycle, state machine 500 enters state 506. It is noted that lack of the remaining 16 bits required to complete a 32-bit address during the next bus cycle causes state machine 500 to transition back to idle state 502.

In state 506, control unit 400 causes buffer 406 to store the lower 16 bits of the valid address now at its inputs from multiplexer 408, and causes multiplexer 408 to direct the upper 16 bits of the valid address from buffer 410 to the inputs to the upper 16 bits of buffer 406. Control unit 400 also causes buffer 412 to store the lower two bits of the bus command at its inputs from multiplexer 414, and causes multiplexer 414 to direct the upper two bits of the bus command from buffer 416 to the inputs to the upper two bits of buffer 412. Control unit 400 causes buffer 410 to store the upper 16 bits of the valid address on AD[15:00], and causes buffer 416 to store the upper two bits of the bus command on C/BE[1:0]#. Control unit 400 also asserts the DEVSEL# control signal on the multiple-transaction A/D bus 110.

The next rising edge of the CLK signal causes state machine 500 to transition to state 508. While in state 508, control unit 400 causes buffer 406 to store the upper 16 bits of the valid address now at its inputs from multiplexer 408. Control unit 400 also directs buffer 412 to store the upper two bits of the bus command now at its inputs from multiplexer 414. Control unit 400 enables the outputs on the PCI bus sides of buffers 406 and 412, generating the 32-bit address on AD[31:00] and the four-bit bus command on C/BE[3:0]#. Control unit 400 asserts the FRAME# control signal on the PCI bus 102. If the bus command in buffer 412 is a write command, control unit 400 asserts the TRDY# signal on the multiple-transaction A/D bus 110.

Figure 7:
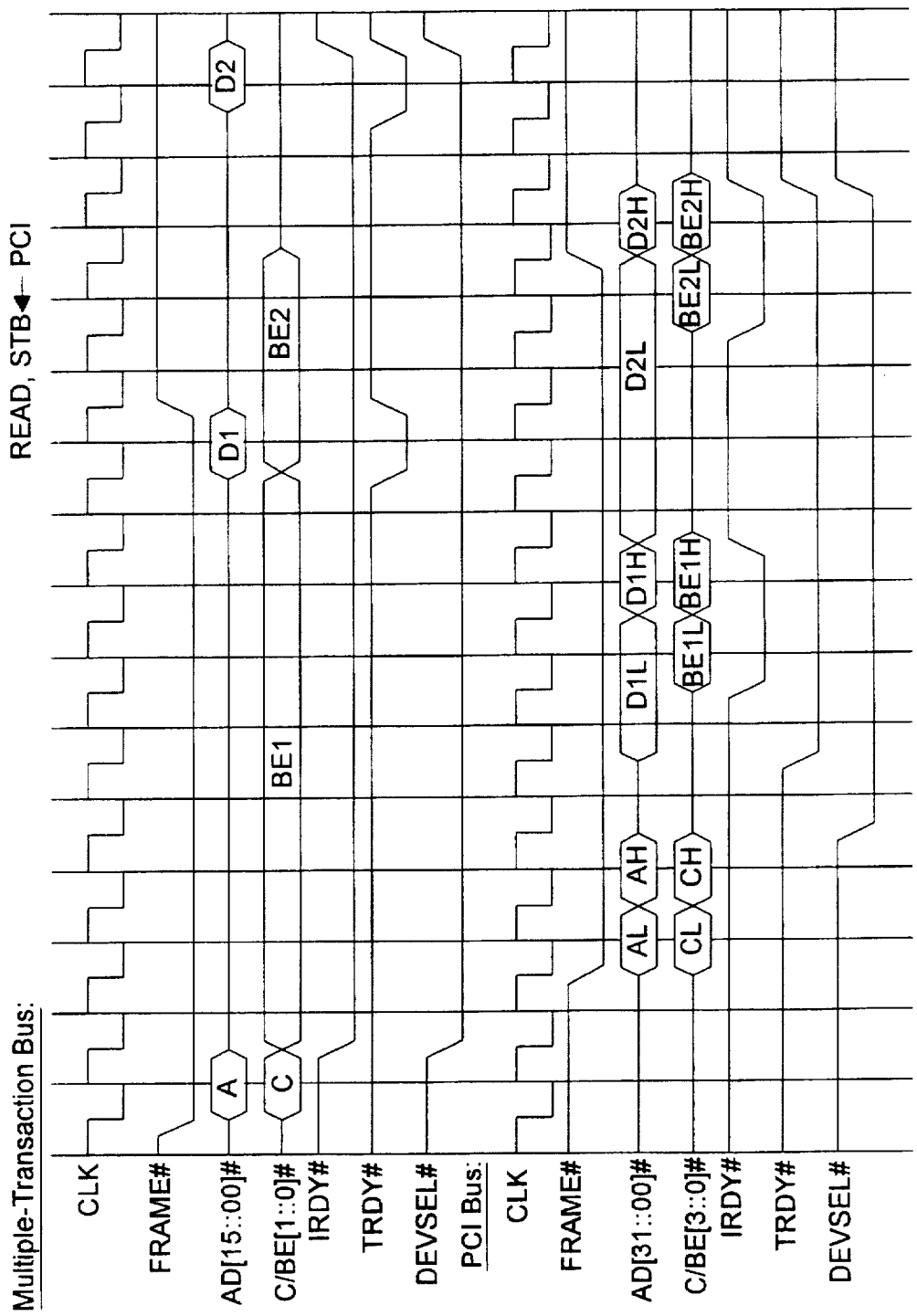
FIG. 7 is a timing diagram which illustrates the generation of address, data, and control signals for a burst read operation between a master device coupled to the multiple-transaction A/D bus and a slave device coupled to the PCI bus of FIG. 1.

If the bus command in buffer 412 is a read command, state machine 500 enters state 510 during the next bus cycle. FIG. 7 is a timing diagram which illustrates the generation of address, data, and control signals for a burst read operation between a master device coupled to the multiple-transaction A/D bus 110 and a slave device coupled to the PCI bus 102.

If the bus command is a write command, state machine 500 enters state 518 at the next rising edge of CLK. A read command will be considered first, and a write command considered further below.

To increase the speed of read operations, 32-bit data doublewords are read from a slave device on the PCI bus 102 before byte enables are being driven by the master device on the spilt-transaction A/D bus. All bytes are enabled during reads from the PCI bus 102, and all bytes are transferred to the multiple-transaction A/D bus 110 from the PCI bus 102.

While in state 510, control unit 400 disables the outputs on the PCI bus side of buffer 406 in preparation for subsequent reads from AD[31:00]. Control unit 400 asserts the IRDY# control signal on the PCI bus 102. Control unit 400 also causes buffer 412 to load the appropriate logic levels in all four bit positions to signal the slave device to send valid data in all byte lanes, and enables the outputs of buffer 412 to the PCI bus 102.

The slave device on the PCI bus 102 enforces a "turn-around cycle" during the next bus cycle via the TRDY# control line while it assumes control of the AD[31:00] lines. State machine 500 stays in state 510 as long as TRDY# is not asserted (i.e., remains at logic high).

The next rising edge of CLK during which TRDY# is asserted (i.e., is at logic low) on the PCI bus 102 causes state machine 500 to transition to state 512. While in state 512, control unit 400 causes buffer 406 to store the 32-bit data doubleword on the AD[31:00] lines of the PCI bus 102. Control unit 400 deasserts IRDY# on the PCI bus 102 as it prepares to repackage the first data doubleword and transmit it on the Multiple-transaction A/D bus 110, and directs multiplexer 408 to direct the lower 16 bits of the 32-bit data doubleword to the inputs to buffer 410 from multiplexer 408. Control unit 400 also deasserts the TRDY# signal on the multiple-transaction A/D bus 110.

State machine 500 enters state 514 at the next rising edge of CLK. In state 514, control unit 400 causes buffer 410 to store the lower 16 bits of the data doubleword now at its inputs from multiplexer 408, and enables the outputs of buffer 410 to the multiple-transaction A/D bus 110, thus generating the lower 16 bits of the data doubleword on the AD[15:00] lines of the multiple-transaction A/D bus 110. Control unit 400 directs multiplexer 408 to direct the upper 16 bits of the data doubleword in buffer 406 to the inputs to buffer 410 from multiplexer 408. Control unit 400 also asserts TRDY# on the multiple-transaction A/D bus 110.

State machine 500 enters state 516 at the next rising edge of CLK (with IRDY# asserted on the multiple-transaction A/D bus 110). In state 516, control unit 400 causes buffer 410 to store the upper 16 bits of the data doubleword now at its inputs from multiplexer 408, thus generating the upper 16 bits of the data doubleword on the AD[15:00] lines of the multiple-transaction A/D bus 110. Control unit 400 causes buffer 412 to load the appropriate logic levels in all four bit positions to signal the slave device to send valid data in all byte lanes, and enables the outputs of buffer 412 to the PCI bus 102. Control unit 400 asserts the IRDY# signal on the PCI bus 102, and causes the FRAME# signal on the PCI bus to mirror the FRAME# signal on the multiple-transaction A/D bus 110.

If all data doublewords have not been read from the slave device on the PCI bus 102, repackaged, and transmitted on the multiple-transaction A/D bus 110, state machine 500 returns to state 512 on the next rising edge of CLK. If all data doublewords have been transmitted, state machine 500 returns to idle state 502 at the next rising edge of CLK.

Figure 8:
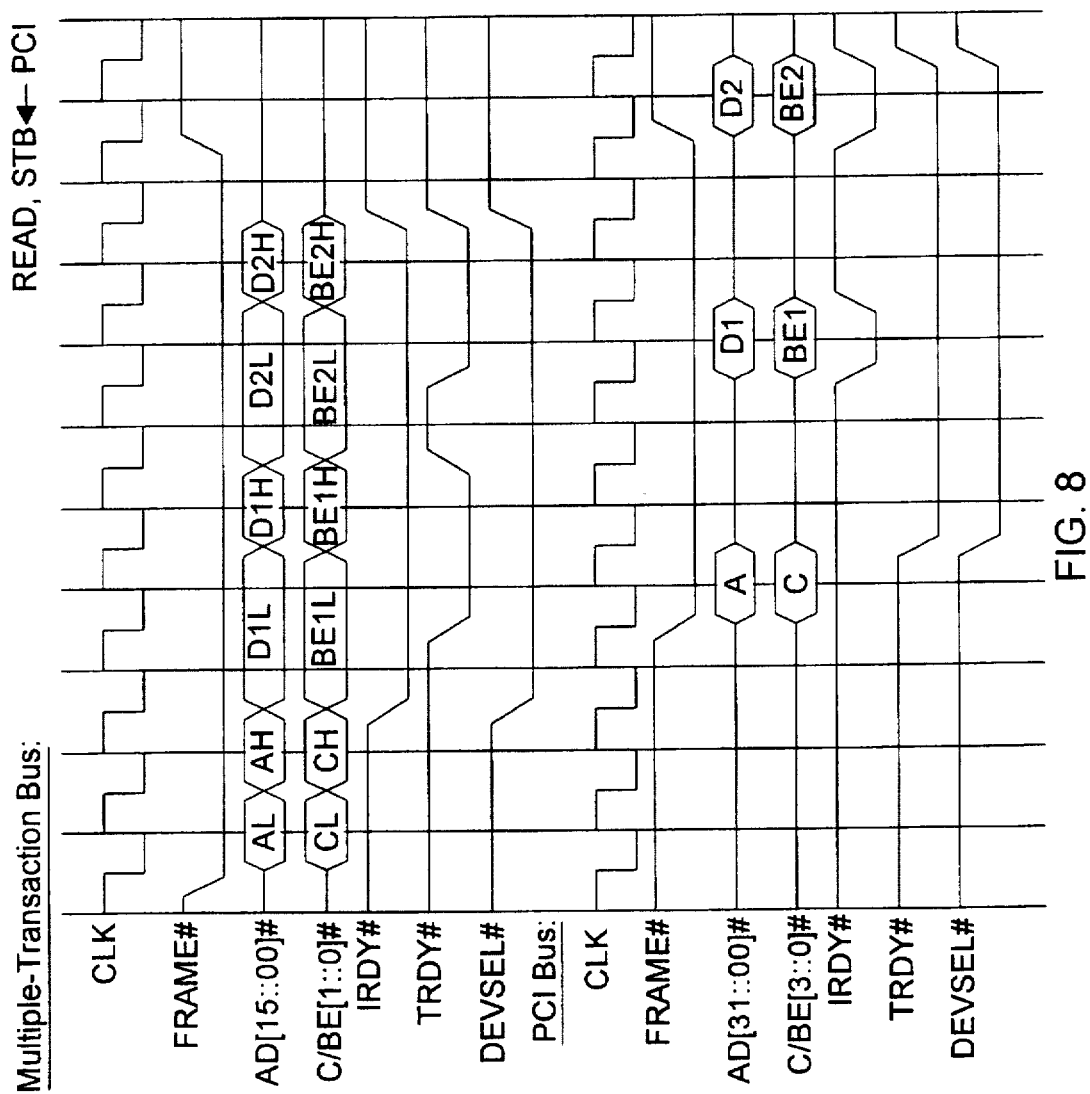
FIG. 8 is a timing diagram which illustrates the generation of address, data, and control signals for a burst write operation between a master device coupled to the multiple-transaction A/D bus and a slave device coupled to the PCI bus of FIG. 1.

If state machine 500 is in state 508 and the bus command at the output of buffer 412 is a write command, state machine 500 enters state 518 at the next rising edge of CLK. FIG. 8 is a timing diagram which illustrates the generation of address, data, and control signals for a burst write operation between a master device coupled to the multiple-transaction A/D bus 110 and a slave device coupled to the PCI bus 102.

While in state 518, control unit 400 causes Buffer 410 to store the lower 16 bits of a 32-bit data doubleword currently on the AD[15:00] lines of the multiple-transaction A/D bus 110. Control unit 400 also causes buffer 416 to store the corresponding two-bit byte enables on C/BE[1:0]#. Control unit 400 also causes multiplexer 408 to direct the lower 16 bits of the data doubleword in buffer 410 to the lower 16-bit inputs of buffer 406 from multiplexer 408. Control unit 400 also causes multiplexer 414 to direct the lower two bits of the byte enables in buffer 416 to the lower two-bit inputs of buffer 412 from multiplexer 414. Control unit 400 also deasserts the IRDY# signal on the PCI bus 102 while it reads from a device on the multiple-transaction A/D bus 110 and repackages the data.

At the next rising edge of CLK (with IRDY# asserted on the multiple-transaction A/D bus 110), state machine 500 enters state 520. While in state 520, control unit 400 causes buffer 412 to store the lower 16 bits of the data doubleword at its inputs from multiplexer 408, and causes multiplexer 408 to direct the upper 16 bits of the data doubleword in buffer 410 to the upper 16-bit inputs of buffer 406 from multiplexer 408. Control unit 400 causes buffer 412 to store the lower two bits of the four-bit byte enables at its inputs from multiplexer 414, and causes multiplexer 414 to direct the upper two bits of the byte enables in buffer 416 to the upper two-bit inputs of buffer 412 from multiplexer 414. Control unit 400 causes buffer 410 to store the upper 16 bits of the 32-bit data doubleword currently on the AD[15:00] lines of the multiple-transaction A/D bus 110, and causes buffer 416 to store the corresponding two-bit byte enables on C/BE[1:0]#. Control unit 400 deasserts the TRDY# signal on the multiple-transaction A/D bus 110 as it prepares to write the 32-bit data doubleword to the PCI bus 102. If FRAME# is not asserted on the multiple-transaction A/D bus 110, control unit 400 deasserts the DEVSEL# signal on the multiple-transaction A/D bus 110.

The next rising edge of the CLK signal causes state machine 500 to transition to state 522. During state 522, control unit 400 causes buffer 406 to store the upper 16 bits of the data doubleword now at its inputs from multiplexer 408. Control unit 400 causes buffer 412 to store the upper two bits of the byte enables now at its inputs from multiplexer 414. Control unit 400 enables the outputs on the PCI bus sides of buffers 406 and 412, generating the 32-bit data doubleword on AD[31:00] and the four-bit byte enables on C/BE[3:0]#. Control unit 400 also asserts IRDY# on the PCI bus 102. If FRAME# is still asserted on the multiple-transaction A/D bus 110, control unit 400 asserts the TRDY# signal on the multiple-transaction A/D bus 110 in preparation for another read request. If FRAME# is not asserted on the multiple-transaction A/D bus 110, control unit 400 deasserts FRAME# on the PCI bus 102.

If all data words have not been read from a master device on the multiple-transaction A/D bus 110, repackaged, and written to a slave device on the PCI bus 102, state machine 500 returns to state 518 on the next rising edge of CLK. If all data words have been transmitted, state machine 500 returns to idle state 502 at the next rising edge of CLK.

Figure 6:
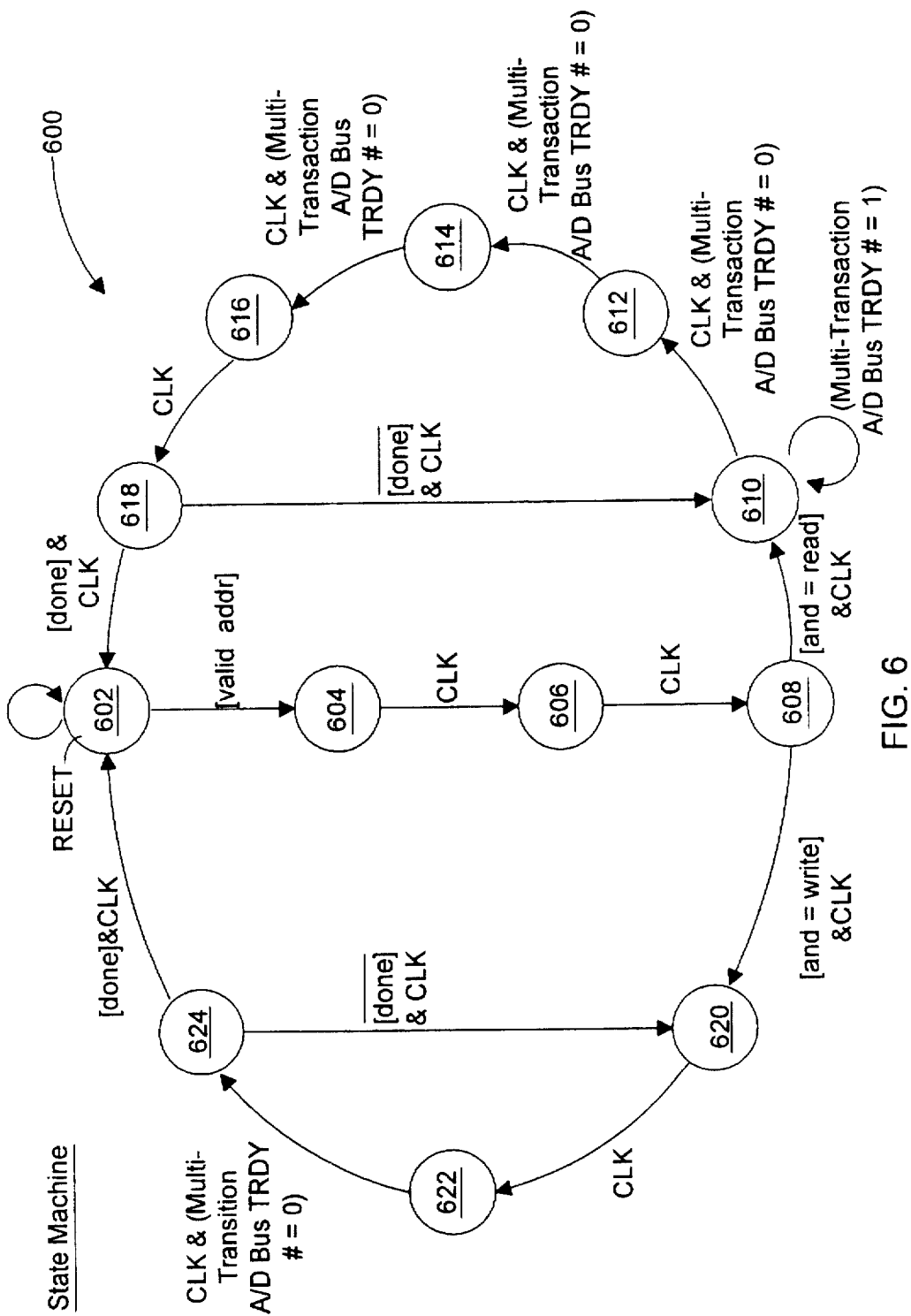
FIG. 6 is a diagram of an algorithmic state machine embodied within the control unit of the bus conversion bridge which handles communications initiated by a device coupled to the 32-bit PCI bus.

Turning next to FIG. 6, a diagram is shown of the algorithmic state machine 600 embodied within the control unit 400 of the bus conversion bridge 108 which handles communications initiated on the PCI bus 102. State machine 600 includes twelve states 602, 604, 606, 608, 610, 612, 614, 616, 618, 620, 622, and 624. State machine enters state 602 when an external RESET signal is asserted, and remains in state 602 when not involved in a bus transaction. In state 602, all bus control signals are deasserted.

When the a valid 32-bit address is detected on the AD[31:00] lines of the PCI bus 102 by decoder 402 during a bus cycle, state machine 600 enters state 604. During state 604, control unit 400 causes buffer 406 to store the valid 32-bit address and causes buffer 412 to store the four-bit bus command on C/BE[3:0]#. Control unit 400 causes multiplexer 408 to direct the lower 16 bits of the valid address in buffer 406 to the inputs of the inputs of buffer 410 from Multiplexer 408, and causes multiplexer 414 to direct the lower two bits of the bus command in buffer 412 to the inputs of buffer 416 from multiplexer 414. Control unit 400 also asserts the DEVSEL# signal on the PCI bus 102.

At the next rising edge of the CLK signal, state machine 600 enters state 606. While in state 606, control unit 400 causes buffer 410 to store the lower 16 bits of the valid address now at its inputs from multiplexer 408, and causes buffer 416 to store the lower two bits of the bus command now at its inputs from multiplexer 414. Control unit 400 causes multiplexer 408 to direct the upper 16 bits of the valid address in buffer 406 to the inputs of buffer 410 from multiplexer 408. Control unit 400 causes multiplexer 414 to direct the upper two bits of the bus command in buffer 412 to the inputs of buffer 416 from multiplexer 414. Control unit 400 enables the outputs on the multiple-transaction A/D bus side of buffers 410 and 416, placing the lower 16 bits of the valid address on AD[15:00] and the lower two bits of the bus command on C/BE[1:0]#. Control unit 400 also asserts the FRAME# signal on the multiple-transaction A/D bus 110.

At the next rising edge of the CLK signal, state machine 600 enters state 608. While in state 608, control unit 400 causes buffer 410 to store the upper 16 bits of the valid address now at its inputs from multiplexer 408, and causes buffer 416 to store the upper two bits of the bus command now at its inputs from multiplexer 414. The outputs on the multiple-transaction A/D bus side of buffers 410 and 416 are still enabled, putting the upper 16 bits of the valid address on AD[15:00] and the upper two bits of the bus command on C/BE[1:0]#. Additionally, if the bus command in buffer 412 is a write command, control unit 400 asserts TRDY# on the PCI bus 102.

Figure 9:
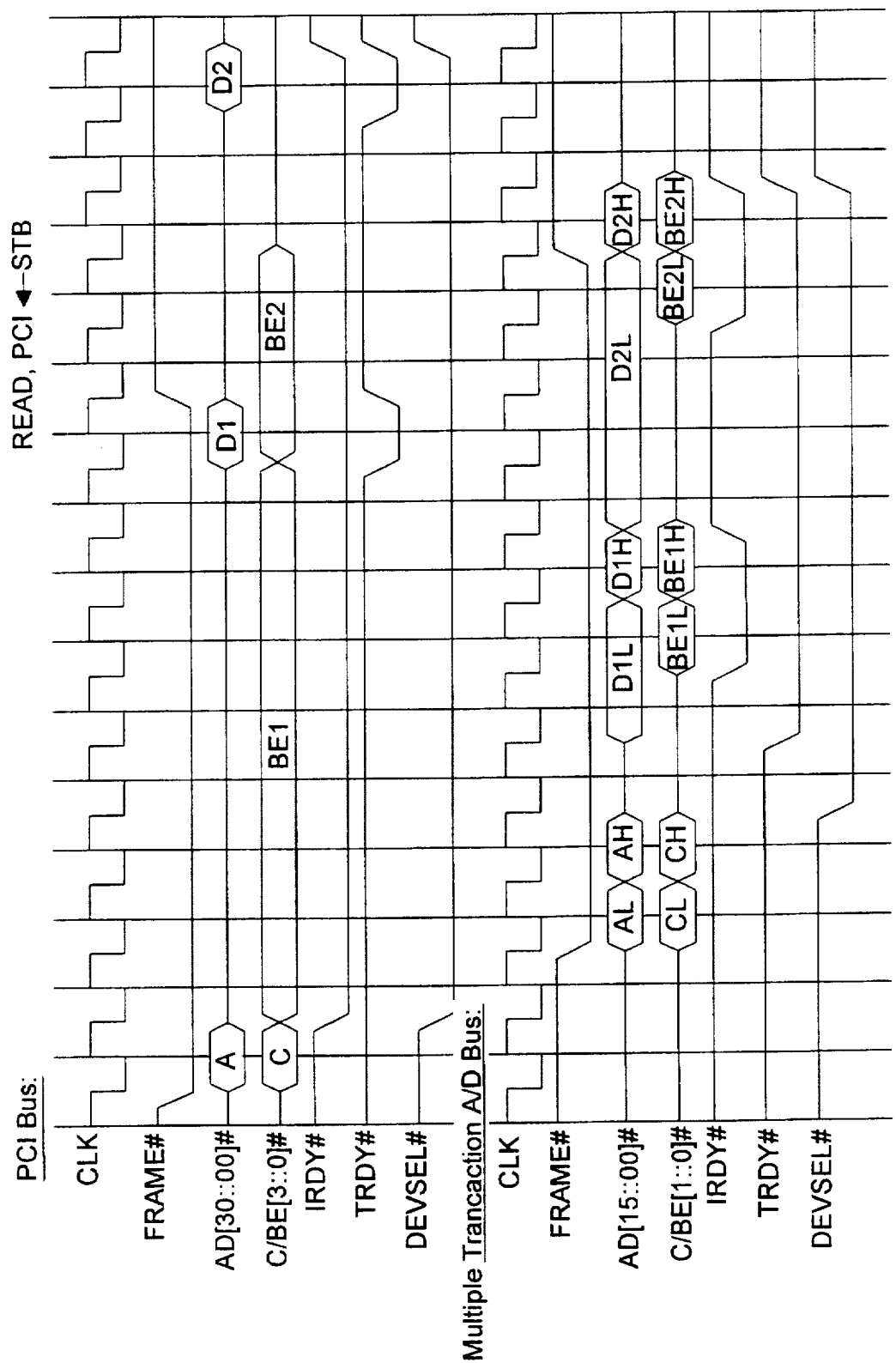
FIG. 9 is a timing diagram which illustrates the generation of address, data, and control signals for a burst read operation between a master device coupled to the PCI bus and a slave device coupled to the multiple-transaction A/D bus of FIG. 1.

If the four-bit bus command in buffer 412 is a read command, state machine 600 enters state 610 during the next bus cycle. FIG. 9 is a timing diagram which illustrates the generation of address, data, and control signals for a burst read operation between a master device coupled to the PCI bus 102 and a slave device coupled to the multiple-transaction A/D bus 110.

If the bus command is a write command, state machine 600 enters state 620 during the next bus cycle. A read command will be considered first, and a write command considered further below.

In state 610, control unit 400 disables the outputs on the multiple-transaction A/D bus side of buffer 410 in preparation for subsequent reads from AD[15:00]. Control unit 400 deasserts the TRDY# signal on the PCI bus 102. Control unit 400 also causes buffer 412 to store the four-bit byte enables on C/BE[3:0]# of the PCI bus 102, and causes multiplexer 414 to direct the lower two bits of the byte enables to the inputs to buffer 416 from multiplexer 414.

The slave device on the multiple-transaction A/D bus 110 complies with a "turnaround cycle" at the beginning of the first data phase by keeping the TRDY# signal deasserted during the turnaround cycle before it assumes control of the AD[15:00] lines. State machine 600 stays in state 610 as long as TRDY# is not asserted (i.e., remains at logic high).

The next rising edge of the CLK signal during which TRDY# is asserted on the multiple-transaction A/D bus 110 causes state machine 600 to transition to state 612. In state 612, control unit 400 causes buffer 416 to store the two-bit byte enables at its inputs from multiplexer 414. Control unit 400 also enables the outputs on the multiple-transaction A/D bus side of buffer 416, generating the lower two bits of the byte enables on C/BE[1:0]# of the multiple-transaction A/D bus 110. Control unit 400 causes multiplexer 414 to direct the upper two bits of the byte enables in buffer 412 to the inputs to buffer 416 from multiplexer 414. Control unit 400 also asserts the IRDY# signal on the multiple-transaction A/D bus 110.

The next rising edge of The CLK signal (during which TRDY# is asserted) causes state machine 600 to transition to state 614. In state 614, control unit 400 causes buffer 410 to store the lower 16 bits of a 32-bit data doubleword on AD[15:00] of the multiple-transaction A/D bus 110. Control unit 400 also causes multiplexer 408 to direct the 16 bits in buffer 410 to the lower 16-bit inputs of buffer 406 from multiplexer 408. control unit 400 also causes buffer 416 to store the two bits at its inputs from multiplexer 414. The outputs on the multiple-transaction A/D bus side of buffer 416 are enabled, generating the byte enables for the upper 16 bits of the 32-bit data doubleword on the C/BE[1:0]# lines of the multiple-transaction A/D bus 110. If FRAME# is no longer asserted on the PCI bus 102, control unit 400 deasserts the FRAME# signal on the multiple-transaction A/D bus 110.

The next rising edge of the CLK signal (during which TRDY# is asserted) causes state machine 600 to transition to state 616. In state 616, control unit 400 causes buffer 410 to store the upper 16 bits of a 32-bit data doubleword on AD[15:00] of the multiple-transaction A/D bus 110. Control unit 400 also causes multiplexer 408 to direct the 16 bits in buffer 410 to the upper 16-bit inputs of buffer 406 from multiplexer 408. Control unit 400 also deasserts the IRDY# signal on the multiple-transaction A/D bus 110 as it prepares to repackage the data word and transmit it over the PCI bus 102.

The next rising edge of the CLK signal causes state machine 600 to transition to 618. During state 618, control unit 400 causes buffer 406 to store the upper 16 bits of the data doubleword now at its inputs from multiplexer 408. Control unit 400 enables the outputs on the PCI bus side of buffer 406, generating the 32-bit data doubleword on AD[31:00]. Control unit 400 also asserts TRDY# on the PCI bus 102.

If all data words have not been read from a slave device on the multiple-transaction A/D bus 110, repackaged, and written to a master device on the PCI bus 102, state machine 600 returns to state 610 on the next rising edge of The CLK signal. If all data words have been transmitted, state machine 600 returns to idle state 602 at the next rising edge of The CLK signal.

Figure 10:
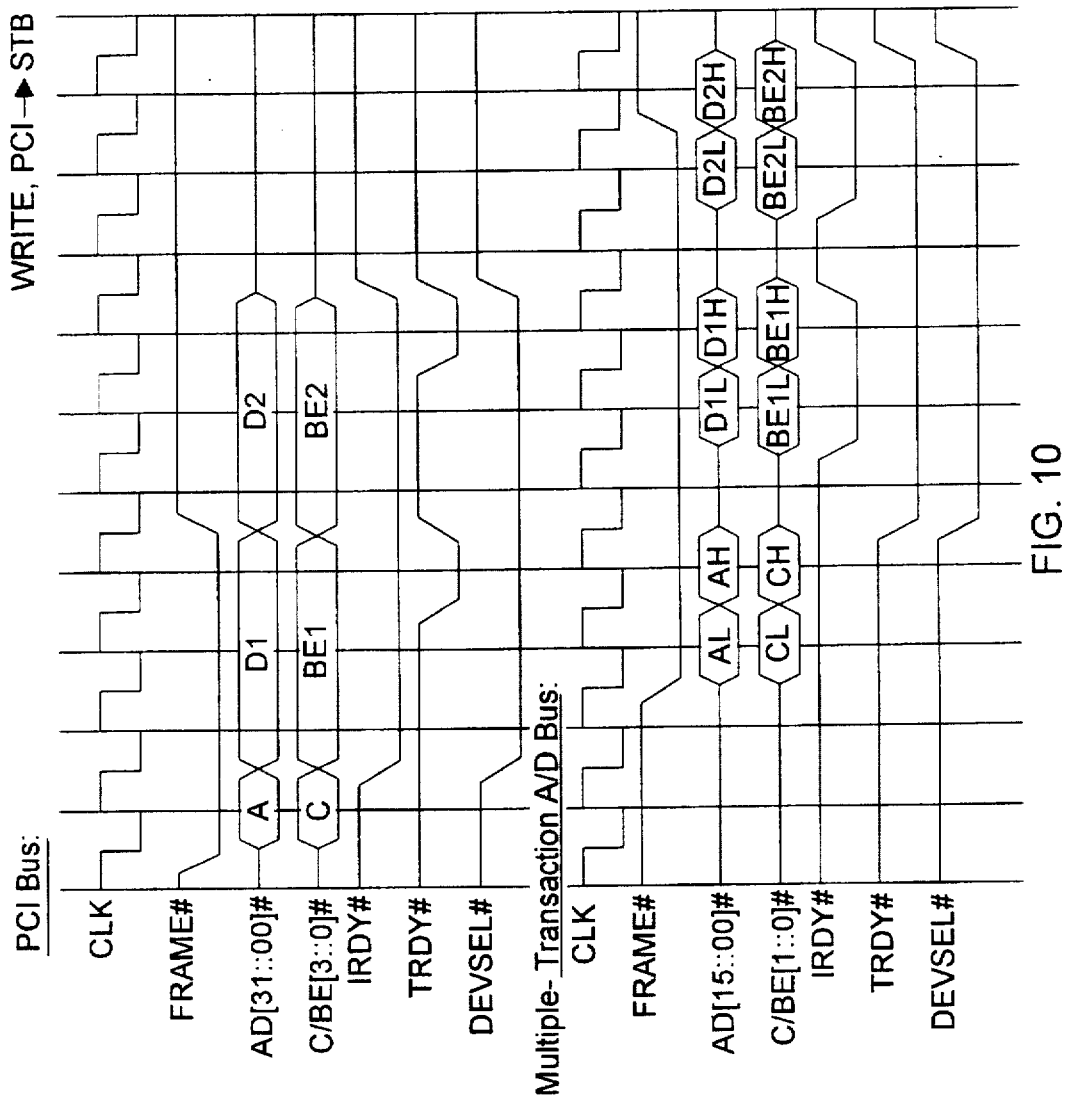
FIG. 10 is a timing diagram which illustrates the generation of address, data, and control signals for a burst write operation between a master device coupled to the PCI bus and a slave device coupled to the multiple-transaction A/D bus of FIG. 1.

If state machine 600 is in state 608 and the bus command in buffer 412 is a write command, state machine 600 enters state 620 at the next rising edge of the CLK signal. FIG. 10 is a timing diagram which illustrates the generation of address, data, and control signals for a burst write operation between a master device coupled to the PCI bus 102 and a slave device coupled to the multiple-transaction A/D bus 110.

While in state 620, control unit 400 causes buffer 406 to store the 32-bit data doubleword currently on the AD[31:00] lines of the PCI bus 102. Control unit 400 causes buffer 412 to store the corresponding four-bit byte enables on C/BE [3:0]#. Control unit 400 causes multiplexer 408 to direct the lower 16 bits of the data doubleword in buffer 406 to the inputs of buffer 410 from multiplexer 408. Control unit 400 causes multiplexer 414 to direct the lower two bits of the byte enables in buffer 412 to the inputs of buffer 416 from multiplexer 414. Control unit 400 also deasserts the TRDY# signal on the PCI bus 102 while it prepares to repackage the data doubleword and transmit it to a slave device on the multiple-transaction A/D bus 110. If FRAME# is no longer asserted on the PCI bus 102, control unit 400 deasserts DEVSEL# on the PCI bus 102. Control unit 400 also deasserts the IRDY# signal on the multiple-transaction A/D bus 110.

State machine 600 enters state 622 at the next rising edge of The CLK signal. During state 622, control unit 400 causes buffer 410 to store the lower 16 bits of the data doubleword now at its inputs from multiplexer 408, and enables the outputs of buffer 410 to the multiple-transaction A/D bus 110, thus generating the lower half of the 32-bit data doubleword on AD[15:00]. Control unit 400 also causes multiplexer 408 to direct the upper 16 bits of the data doubleword in buffer 406 to the inputs of buffer 410 from multiplexer 408. Control unit 400 causes buffer 416 to store the lower two bits of the byte enables now at its inputs from multiplexer 414, and enables the outputs of buffer 416 to the multiple-transaction A/D bus 110, thus generating the corresponding byte enables on C/BE[1:0]#. Control unit 400 also directs multiplexer 414 to direct the upper two bits of the byte enables in buffer 412 to the inputs to buffer 416 from multiplexer 414. Control unit 400 also asserts the IRDY# signal on the multiple-transaction A/D bus 110.

At the next rising edge of the CLK signal (with TRDY# asserted on the multiple-transaction A/D bus 110), state machine 600 enters state 624. In state 624, control unit 400 causes buffer 410 to store the upper 16 bits of the data doubleword now at its inputs from multiplexer 408. The outputs on the multiple-transaction A/D bus side of buffer 410 are still enabled, generating the upper 16 bits of the 32-bit data doubleword on AD[15:00] of the multiple-transaction A/D bus 110. Control unit 400 causes buffer 416 to store the upper two bits of the byte enables now at its inputs from multiplexer 414. The outputs on the multiple-transaction A/D bus side of buffer 416 are still enabled, generating the corresponding byte enables on C/BE[1:0]#. If another data word is to be written, Control Unit 400 asserts TRDY# on the PCI bus 102. If DEVSEL# is no longer asserted on the PCI bus 102, control unit 400 deasserts FRAME# on the multiple-transaction A/D bus 110.

If all data doublewords have not been read from the master device on the PCI bus 102, repackaged, and written to the slave device on the multiple-transaction A/D bus 110, state machine 600 returns to state 620 on the next rising edge of The CLK signal. If all data words have been transmitted, state machine 600 returns to idle state 602 at the next rising edge of The CLK signal.

It will be appreciated that the bus conversion bridge 108 of FIG. 1 as illustrated in FIGS. 4-10 and described above employs minimal conversion logic to form an interface between a high-performance PCI bus system and a multiple-transaction A/D bus system with half the number of multiplexed address/data lines of a 32-bit PCI bus. The multiple-transaction A/D bus is particularly suited for portable applications and accommodates, with minimal modification, compatibility with existing PCI hardware designs.

It is further understood that variations in the specific circuitry used to implement the bus conversion bridge are possible. In one specifically contemplated alternative configuration, a single buffering element may be employed to buffer data between the busses (rather than employing two separate buffers 406 and 410 as shown in FIG. 4). A single buffering element may further be used to buffer control and address signals between the busses. For such a configuration, delays in transferring data and other signals between the busses may be advantageously minimized.

Figure 11:
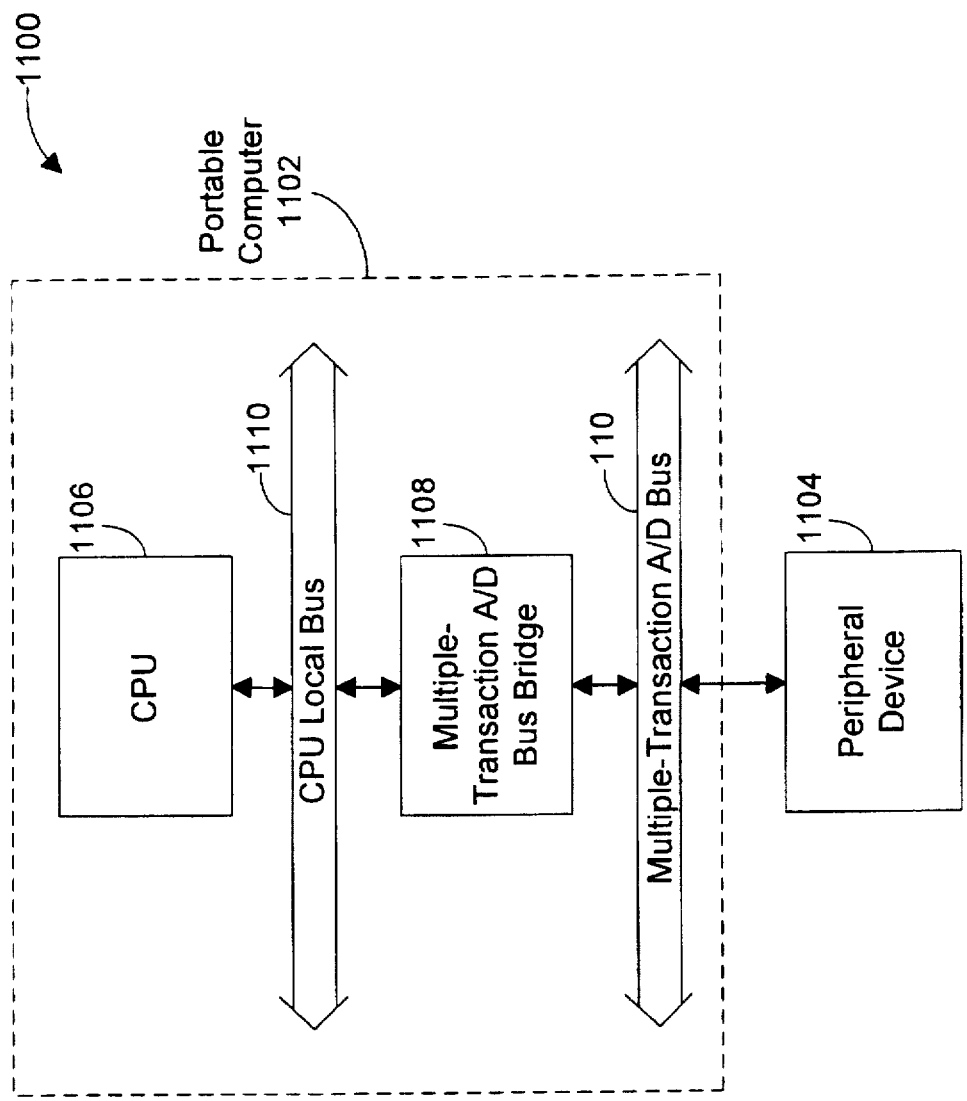
FIG. 11 is a block diagram of a computer system including the 16-bit multiple-transaction A/D bus.

Turning next to FIG. 11, a block diagram of a computer system 1100 is shown wherein a portable computer 1102 and a peripheral device 1104 are coupled to the multiple-transaction A/D bus 110. Portable computer 1102 includes a CPU 1106 and a multiple-transaction A/D bus bridge 1108 coupled to a CPU local bus 1110. It is noted the CPU local bus 1110 may couple CPU 1106 to a variety of other components, such as a cache memory and a memory controller.

The multiple-transaction A/D bus 110 employs a relatively small number of control and data lines to allow devices coupled to it to exchange information. It is noted that the multiple-transaction A/D bus bridge 1108 employs circuitry to effectuate the multiple-transaction A/D bus protocols depicted in FIGS. 2 and 3 and described above. The multiple-transaction A/D bus bridge 1108 performs the interface functions required to permit the CPU 1106 to receive information from and transfer information to peripheral device(s) coupled to the multiple-transaction A/D bus 110 (e.g., peripheral device 1104).

While the embodiment described above transfers 32-bit doublewords in "little endian" format wherein the low order 16 bits are transferred first, the high order 16 bits could just as easily be transferred first in "big endian" format. Furthermore, while transfers of 32-bit data doublewords are required during every data phase in the above embodiment, the multiple-transaction A/D bus could be configured to transfer only 16 bits of data during a data phase to achieve higher performance in situations where only 16 bits of data are requested and valid.

Numerous variations and modifications will become apparent to those skilled in the art once the above disclosure is fully appreciated. It is intended that the following claims be interpreted to embrace all such variations and modifications.

What is claimed is:

1. A computer system comprising:

a first peripheral bus having a first set of multiplexed address/data lines;

a second peripheral bus having a second set of multiplexed address/data lines;

a bus conversion bridge coupled between said first peripheral bus and said second peripheral bus, wherein said bus conversion bridge is configured to receive address information from said first set of multiplexed address/data lines during an address phase, to separate said address information into a first address portion and a second address portion, to drive said first address portion on said second set of multiplexed address/data lines during a first address transaction, and to drive said second address portion on said second set of multiplexed address/data lines during a second address transaction following said first address transaction, and wherein said bus conversion bridge is configured to receive data information from said first set of multiplexed address/data lines during a data phase, to separate said data information into a first data portion and a second data portion, to drive said first data portion on said second set of multiplexed address/data lines during a first data transaction, and to drive said second data portion on said second set of multiplexed address/data lines during a second data transaction following said first data transaction, wherein said bus conversion bridge includes:

a state machine, wherein said state machine is configured to receive an address signal from said first set of multiplexed address/data lines of said first peripheral bus during an address phase and transmit said address signal on said second set of multiplexed address/data lines of said second peripheral bus during multiple transactions and to receive a data signal from said first set of multiplexed address/data lines of said first peripheral bus during a data phase and transmit said data signal on said second set of multiplexed address/data lines of said second peripheral bus during multiple transactions;

a buffer configured to store address/data information present on said first set of address/data lines of said first peripheral bus; and a multiplexer configured to direct portions of address/data information stored in said buffer to said second set of address/data lines of said second peripheral bus; and a master device coupled to said first peripheral bus, wherein said master device is capable of driving address and data information onto and receiving address and data information from said first set of multiplexed address/data lines of said peripheral bus.

2. The computer system as recited in claim 1 further comprising a slave device coupled to said second peripheral bus, wherein said slave device is capable of driving address and data information onto and receiving address and data information from said second set of multiplexed address/data lines of said second peripheral bus.

3. A computer system comprising:

a first peripheral bus having a first set of multiplexed address/data lines;

a second peripheral bus having a second set of multiplexed address/data lines;

a bus conversion bridge coupled between said first peripheral bus and said second peripheral bus, wherein said bus conversion bridge is configured to receive address information from said first set of multiplexed address/data lines during an address phase, to separate said address information into a first address portion and a second address portion, to drive said first address portion on said second set of multiplexed address/data lines during a first address transaction, and to drive said second address portion on said second set of multiplexed address/data lines during a second address transaction following said first address transaction, and wherein said bus conversion bridge is configured to receive data information from said first set of multiplexed address/data lines during a data phase, to separate said data information into a first data portion and a second data portion, to drive said first data portion on said second set of multiplexed address/data lines during a first data transaction, and to drive said second data portion on said second set of multiplexed address/data lines during a second data transaction following said first data transaction;

wherein said first peripheral bus further comprises a first set of multiplexed control/byte enable lines, and said second peripheral bus further comprises a second set of multiplexed control/byte enable lines.

4. The computer system as recited in claim 3 wherein said bus conversion bridge comprises:
   a first buffer with a first and second set of input/output lines and a control line, wherein said first set of input/output lines are coupled to said first set of multiplexed address/data lines of said first peripheral bus;
   a second buffer with a first and second set of input/output lines and a control line, wherein said first set of input/output lines are coupled to said first set of multiplexed control/byte enable lines of said first peripheral bus;
   a first multiplexer with a first and second set of input/output lines and a control line, wherein said first set of input/output lines are coupled to said second set of input/output lines of said first buffer, and wherein said second set of input/output lines are coupled to said second set of multiplexed address/data lines of said second peripheral bus;
   a second multiplexer with a first and second set of input/output lines and a control line, wherein said first set of input/output lines are coupled to said second set of input/output lines of said second buffer, and wherein said second set of input/output lines are coupled to said second set of multiplexed control/byte enable lines of said second peripheral bus; and
   a control unit coupled to said control lines of said first and second buffers and first and second multiplexers, wherein said control unit invokes an algorithmic state machine to effect said transfer of address and data information between said master peripheral device on said first peripheral bus and said slave peripheral device on said second peripheral bus.

5. A computer system comprising:
   a first peripheral bus having a first set of multiplexed address/data lines;
   a second peripheral bus having a second set of multiplexed address/data lines, wherein a total number of lines forming said first set of multiplexed address/data lines and the total number of lines forming said second set of multiplexed address/data lines form a ratio equal to an integer;
   a bus conversion bridge coupled between said first peripheral bus and said second peripheral bus, wherein said bus conversion bridge is configured to receive address information from said first set of multiplexed address/data lines during an address phase, to separate said address information into a first address portion and a second address portion, to drive said first address portion on said second set of multiplexed address/data lines during a first address transaction, and to drive said second address portion on said second set of multiplexed address/data lines during a second address transaction following said first address transaction, and wherein said bus conversion bridge is configured to receive data information from said first set of multiplexed address/data lines during a data phase, to separate said data information into a first data portion and a second data portion, to drive said first data portion on said second set of multiplexed address/data lines during a first data transaction, and to drive said second data portion on said second set of multiplexed address/data lines during a second data transaction following said first data transaction, wherein said bus conversion bridge further includes:
   a state machine configured to receive an address signal from said first set of multiplexed address/data lines of said first peripheral bus during an address phase and transmit said address signal on said second set of multiplexed address/data lines of said second peripheral bus during multiple transactions and to receive a data signal from said first set of multiplexed address/data lines of said first peripheral bus during a data phase and transmit said data signal on said second set of multiplexed address/data lines of said second peripheral bus during multiple transactions;
   a buffer configured to store address/data information present on said first set of address/data lines of said first peripheral bus; and
   a multiplexer configured to direct portions of address/data information stored in said buffer to said second set of address/data lines of said second peripheral bus; and
   a master device coupled to said first peripheral bus, wherein said master device is capable of driving address and data information onto said receiving address and data information onto and receiving address address/data lines of said first peripheral bus.

6. The computer system as recited in claim 5 further comprising a slave device coupled to said second peripheral bus, wherein said slave device is capable of driving address and data information onto and receiving address and data information from said second set of multiplexed address/data lines of said second peripheral bus.

7. A computer system comprising:
   a first peripheral bus having a first set of multiplexed address/data lines;
   a second peripheral bus having a second set of multiplexed address/data lines, wherein a total number of lines forming said first set of multiplexed address/data lines and the total number of lines forming said second set of multiplexed address/data lines from a ratio equal to an integer; and
   a bus conversion bridge coupled between said first peripheral bus and said second peripheral bus, wherein said bus conversion bridge is configured to receive address information from said first set of multiplexed address/data lines during an address phase, to separate said address information into a first address portion and a second address portion, to drive said first address portion on said second set of multiplexed address/data lines during a first address transaction, and to drive said second address portion on said second set of multiplexed address/data lines during a second address transaction following said first address transaction, and wherein said bus conversion bridge is configured to receive data information from said first set of multiplexed address/data lines during a data phase, to separate said data information into a first data portion and a second data portion, to drive said first data portion on said second set of multiplexed address/data lines during a first data transaction, and to drive said second data portion on said second set of multiplexed address/data lines during a second data transaction following said first data transaction, wherein said first peripheral bus further comprises a first set of multiplexed control lines, and said second peripheral bus further comprises a second set of multiplexed control lines.

8. The computer system as recited in claim 7 wherein said bus conversion bridge comprises:
   a first buffer with a first and second set of input/output lines and a control line, wherein said first set of input/output lines are coupled to said first set of multiplexed address/data lines of said first peripheral bus;

a second buffer with a first and second set of input/output lines and a control line, wherein said first set of input/output lines are coupled to said first set of multiplexed control lines of said first peripheral bus;

a first multiplexer with a first and second set of input/output lines and a control line, wherein said first set of input/output lines are coupled to said second set of input/output lines of said first buffer, and wherein said second set of input/output lines are coupled to said second set of multiplexed address/data lines of said second peripheral bus;

a second multiplexer with a first and second set of input/output lines and a control line, wherein said first set of input/output lines are coupled to said second set of input/output lines of said second buffer, and wherein said second set of input/output lines are coupled to said second set of multiplexed control lines of said second peripheral bus; and a control unit coupled to said control lines of said first and second buffers and first and second multiplexers, wherein said control unit invokes an algorithmic state machine to effect said transfer of address and data information between said master peripheral device on said first peripheral bus and said slave peripheral device on said second peripheral bus.

9. A computer system comprising:

a first peripheral bus having a first set of multiplexed address/data lines, and a first set of multiplexed control lines;

a second peripheral bus having a second set of multiplexed address/data lines and a second set of multiplexed control lines;

a bus conversion bridge coupled between said first peripheral bus and said second peripheral bus, wherein said bus conversion bridge is configured to receive address information from said first set of multiplexed address/data lines during an address phase, to separate said address information into a first address portion and a second address portion, to drive said first address portion on said second set of multiplexed address/data lines during a first address transaction, and to drive said second address portion on said second set of multiplexed address/data lines during a second address transaction following said first address transaction, and wherein said bus conversion bridge is configured to receive an encoded control signal indicating either a read cycle or a write cycle from said first set of multiplexed control lines during said address phase, to separate said encoded control signal into a first control signal portion and a second control signal portion, to drive said first control signal portion on said second set of multiplexed control lines during said first address transaction, and to drive said second control portion on said second set of multiplexed control lines during said second address transaction, and wherein said bus conversion bridge is configured to receive data information from said first set of multiplexed address/data lines during a data phase, to separate said data information into a first data portion and a second data portion, to drive said first data portion on said second set of multiplexed address/data lines during a first data transaction, and to drive said second data portion on said second set of multiplexed address/data lines during a second data transaction following said first data transaction, and wherein said bus conversion bridge is configured to receive a byte enable signal from said first set of multiplexed control lines during said data phase, to separate said byte enable signal into a first byte enable signal portion and a second byte enable signal portion, and to drive said first byte enable signal portion on said second set of multiplexed control lines during said first data transaction, and to drive said second byte enable portion on said second set of multiplexed control lines during said second data transaction, wherein said bus conversion bridge includes:

a first buffer with a first and second set of input/output lines and a control line, wherein said first set of input/output lines are coupled to said first set of multiplexed address/data lines of said first peripheral bus;

a second buffer with a first and second set of input/output lines and a control line, wherein said first set of input/output lines are coupled to said first set of multiplexed control lines of said first peripheral bus;

a first multiplexer with a first and second set of input/output lines and a control line, wherein said first set of input/output lines are coupled to said second set of input/output lines of said first buffer, and wherein said second set of input/output lines are coupled to said second set of multiplexed address/data lines of said second peripheral bus;

a second multiplexer with a first and second set of input/output lines and a control line, wherein said first set of input/output lines are coupled to said second set of input/output lines of said second buffer, and wherein said second set of input/output lines are coupled to said second set of multiplexed control lines of said second peripheral bus; and a control unit coupled to said control lines of said first and second buffers and first and second multiplexers, wherein said control unit invokes an algorithmic state machine to effect said transfer of address and data information between said master peripheral device on said first peripheral bus and said slave peripheral device on said second peripheral bus.

* * * * *

UNITED STATES PATENT AND TRADEMARK OFFICE
CERTIFICATE OF CORRECTION

PATENT NO. : 5,761,443

DATED : June 2, 1998

INVENTOR(S) : Uwe Kranich

It is certified that error appears in the above-indentified patent and that said Letters Patent is hereby corrected as shown below:

Claim 5, col. 16, lines 18 and 19, please delete the phrase "said receiving address and data information onto and receiving" and replace with the phrase --and receiving address and data information from said first set of multiplexed--.

Signed and Sealed this

Eighteenth Day of August, 1998

Attest:

BRUCE LEHMAN

*Attesting Officer*  *Commissioner of Patents and Trademarks*